May 31, 1927.
W. G. ELDER
1,630,475
LINE REEL AND PIN
Filed Oct. 13, 1926
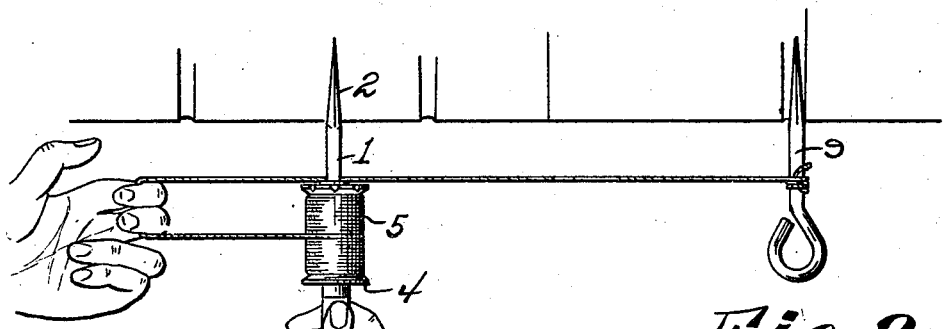
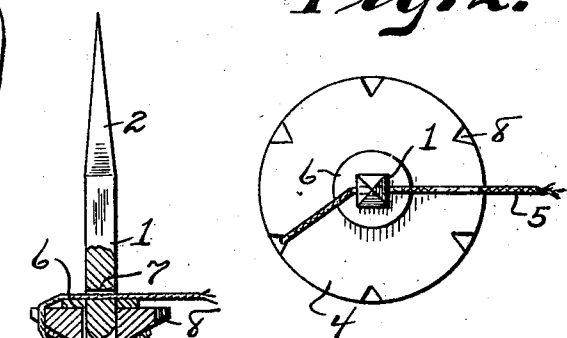
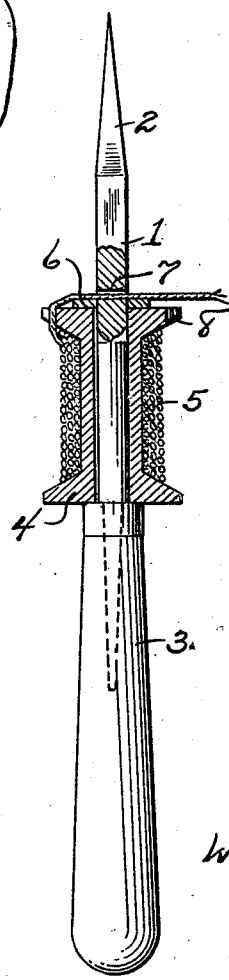
William G. Elder
INVENTOR
BY *Victor J. Evans*
ATTORNEY
WITNESS:

Patented May 31, 1927.

1,630,475

UNITED STATES PATENT OFFICE.

WILLIAM GEORGE ELDER, OF BARDSTOWN, KENTUCKY, ASSIGNOR TO ELDER MANUFACTURING COMPANY, OF BARDSTOWN, KENTUCKY.

LINE REEL AND PIN.

Application filed October 13, 1926. Serial No. 141,417.

This invention relates to means for supporting line such as used by bricklayers in laying bricks, the general object of the invention being to provide means whereby the line can be easily and quickly put in place.

Another object of the invention is to provide a reel for the line which is arranged on a pin which acts as supporting means for one end of the line, with means for holding the reel against movement when the line is drawn tight.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view showing the line being put in place on a row of bricks.

Figure 2 is an end view of the pin and reel, with the line taut.

Figure 3 is an elevation of the pin, with parts broken away and with the reel in section.

In these views, 1 indicates a stem which is provided with a point 2 and which has a handle 3 connected therewith. A reel 4 for a line 5 is rotatably held on the stem between the handle and a collar 6. Adjacent the collar, the stem is provided with a hole 7 through which the line is adapted to pass. The reel is of spool shape and the end adjacent the collar is provided with a plurality of notches 8 in the edge of its flange. A pin 9 is used to support the other end of the line.

As shown in Figure 1, the pin 9 is placed in position, by being placed between two bricks, for instance, and the end of the line is attached to this pin. The handle 3 is grasped by one hand and a portion of the line between the reel and the holes 7 is looped over some of the fingers of the other hand. Thus by pulling on the line by these fingers, the line will be unwound from the reel, the reel rotating on the stem and as the workman walks away from the pin 9, the string will pass through the hole as the reel carrying parts are moved along the wall. When the point in the wall is reached where the reel carrying device is to be anchored, the line is freed from the fingers and a portion of the line is permitted to engage one of the notches 8 so that further turning movement of the reel is prevented. Then the point 2 can be pressed into the mortar between a pair of bricks to anchor the device.

As will be seen, with this device the line can be easily and quickly put in place and after being used, it can be wound upon the reel so that there is no danger of the line becoming entangled.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a pointed member having a transverse hole therein, a flanged reel rotatably mounted on the member and a line wound upon the reel and adapted to pass through the hole, the reel having notches in one of the flanges thereof for receiving a part of the line to prevent rotary movement of the reel.

2. A device of the class described comprising a stem having a point at one end, a handle at the other end, a flanged reel rotatably mounted on the stem, between the handle and the pointed end, said stem having a transverse hole therein adjacent one end of the reel, this end of the reel having notches in its flange and a line wound on the reel and passing through the hole in the stem and adapted to engage one of the notches when the line is taut to prevent rotary movement of the reel.

In testimony whereof I affix my signature.

WILLIAM GEORGE ELDER.